J. M. C. JONES.
SCRAPER FOR GREEN CORN CUTTING MACHINES.
APPLICATION FILED OCT. 16, 1913.
1,092,995.
Patented Apr. 14, 1914.
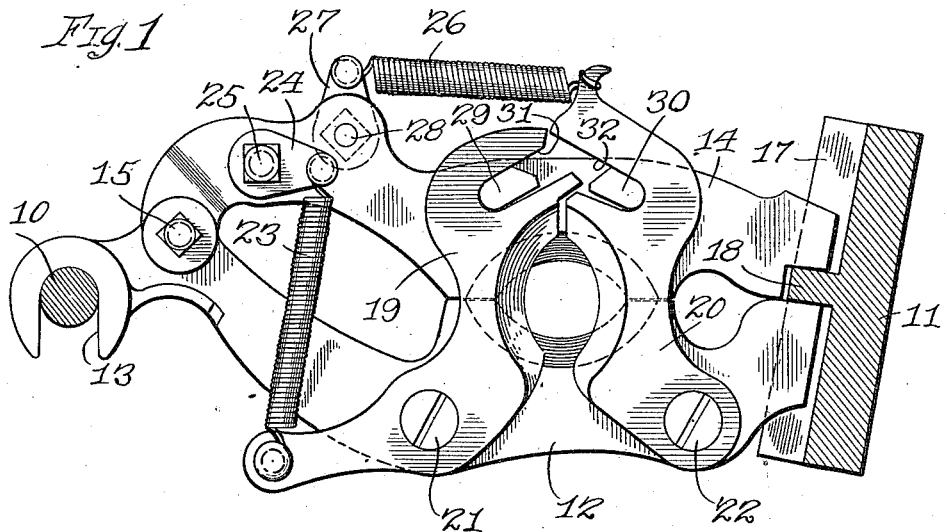
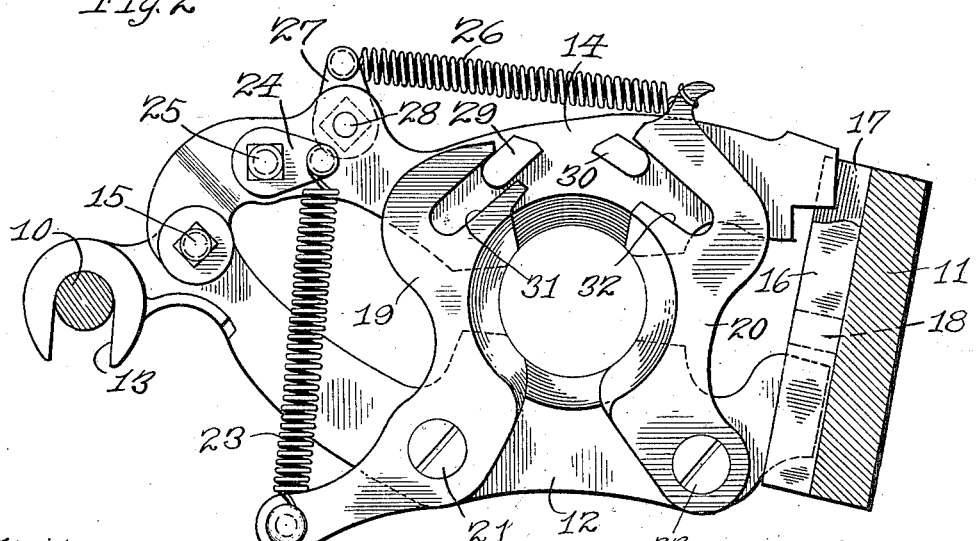
Witnesses:
L. B. Graham
W. A. Furnner.
Inventor:
John M. C. Jones
By Adams & Jackson
Att'ys.

UNITED STATES PATENT OFFICE.

JOHN M. C. JONES, OF ONARGA, ILLINOIS.

SCRAPER FOR GREEN-CORN-CUTTING MACHINES.

1,092,995.  Specification of Letters Patent.  Patented Apr. 14, 1914.

Application filed October 16, 1913. Serial No. 795,401.

*To all whom it may concern:*

Be it known that I, JOHN M. C. JONES, a citizen of the United States, residing at Onarga, in the county of Iroquois, State of Illinois, have invented certain new and useful Improvements in Scrapers for Green-Corn-Cutting Machines, of which the following is a specification, reference being had to the accompanying drawing.

This invention relates to scraping devices for green corn cutting machines, through which scraping devices the cobs are to be passed after the major portion of the corn has been cut therefrom.

It is one of the objects of this invention to provide a scraping device which is able to accommodate itself to cobs of different sizes so that in any case the scraper entirely surrounds the cob.

It is another object of my invention to provide a form and arrangement of scraping device by reason of which it can be easily and readily removed from the machine when desired.

It is another object of my invention to improve devices of this type in sundry details hereinafter pointed out.

The means by which I have accomplished these objects are illustrated in the drawings and are hereinafter specifically described.

That which I believe to be new is set forth in the claims.

In the drawings,—Figure 1 is a side view of one of my improved scraping devices in position in a green corn cutting machine; and Fig. 2 is a view similar to Fig. 1 but with the scraping blades forced apart for the passage of a large sized cob.

Referring to the several figures of the drawings in which corresponding parts are indicated by the same reference characters, 10 indicates a bar extending longitudinally of the green corn cutting machine, and 11 indicates a plate at a convenient distance from the bar 10 and extending parallel therewith.

My improved scraper is designed for use preferably with a green corn cutting machine of the type shown in United States Patent No. 1,037,014, issued to me on August 27, 1912. It will be understood that an improved scraping device of the type herein shown is to be substituted for each pair of scrapers 157—158 and 159—160 of the patented machine, a set of the improved scraping devices being used between each two adjacent pairs of spur rollers just as in the patented construction. It will be understood that the bar 10 and plate 11 for supporting the improved scraping devices will be suitably positioned parallel to the plates 112—113 of the patented machine.

12 indicates a scraping blade provided at one end with a suitable socket 13 adapted to be slipped upon the rod 10. 14 indicates a second scraping blade pivotally mounted by means of a bolt 15 upon the scraping blade 12 adjacent to one end thereof.

16—17 indicate vertically extending guide ribs upon the plate 11 between which the free ends of the scraping blades 12—14 are adapted to move, and 18 indicates a rib extending longitudinally of the plate 11 against which the ends of said scraping blades are adapted to bear when in their normal closed position.

19—20 indicate a second pair of oppositely disposed scraping blades pivotally mounted at their lower ends upon the scraping blade 12 by means of suitable pivot pins 21—22, respectively.

23 indicates a spring connected at its lower end to the lower end of the scraping blade 19 and connected at its upper end to an arm 24 which is adjustably mounted by means of a bolt 25 upon the scraping blade 14.

26 indicates a coiled spring connected at one end to the upper end of the scraping blade 20 and connected at its other end to an arm 27 adjustably mounted by means of a bolt 28 upon the scraping blade 14.

As will be readily understood the springs 23—26 tend to move the scraping blades 19—20 toward each other and to hold them yieldingly in the position shown in Fig. 1.

29—30 indicate lugs mounted upon the scraping blade 14 in diagonal position thereupon.

31—32 indicate slots in the upper ends of the scraping blades 19—20, respectively, adapted to have sliding engagement with the lugs 29—30, the parts being so positioned that each pair of oppositely disposed scraping blades are allowed to close together as shown in Fig. 1.

As will be readily understood when either the scraping blades 19—20 or the blades 12—14 are forced apart the other pair of scraping blades will also be forced apart by reason of the diagonal location of the lugs 29—30 and the slots 31—32. In this way all four scraping blades are caused to coöperate to furnish a suitable scraping edge about the entire periphery of the cob by which the blades are forced apart whatever the size of the cob may be.

By the use of my improved scraper I am enabled to scrape from the cob practically all of the nutritious part of the corn, thus making a considerable saving as compared to the results heretofore attainable. Moreover, as will be readily appreciated, the saving of the hearts of the kernels is of especial importance inasmuch as this is the richest and sweetest part of the corn, giving the product the highly desired flavor not possessed by a product having in it a smaller proportion of such hearts of the corn.

What I claim as my invention and desire to secure by Letters Patent, is—

1. In a scraper for green corn cutting machines, the combination of a scraping blade, a pair of scraping blades pivotally mounted on said first-mentioned scraping blade opposite each other, and yielding means tending to hold said pair of scraping blades together.

2. In a scraper for green corn cutting machines, the combination of a scraping blade, a pair of oppositely disposed scraping blades positioned alongside of said first-mentioned scraping blade at an angle thereto, said second-named scraping blades being movable toward and from each other, and connections between said first-mentioned scraping blade and said second-named scraping blades whereby when said second-named scraping blades are forced apart said first-mentioned blade is moved longitudinally of said second-named scraping blades.

3. In a scraper for green corn cutting machines, the combination of a pair of oppositely disposed scraping blades movable toward and away from each other, a third scraping blade positioned alongside of said first-mentioned scraping blades at an angle thereto, and connections between one of said first-mentioned scraping blades and said third scraping blade whereby when said first-mentioned scraping blades are forced apart said third scraping blade is moved longitudinally of said first-mentioned scraping blades.

4. In a scraper for green corn cutting machines, the combination of a pair of oppositely disposed scraping blades movable toward and from each other, a second pair of oppositely disposed scraping blades positioned alongside of said first-mentioned scraping blades at an angle thereto, said second pair of scraping blades being also movable toward and from each other, and connections between said second-named scraping blades and one of said first-named scraping blades whereby when either pair of blades are forced apart the other pair of blades are at the same time forced apart.

5. In a scraper for green corn cutting machines, the combination of a scraping blade, a second scraping blade pivotally mounted thereon in alinement therewith, a pair of oppositely disposed scraping blades pivotally mounted on said first-mentioned blade at an angle thereto, and connections between said last-named scraping blades and said second scraping blade whereby when either pair of oppositely disposed blades are forced apart the other pair of scraping blades are also forced apart.

6. In a scraper for green corn cutting machines, the combination of a pivotally mounted scraping blade, a second scraping blade pivotally mounted at an angle thereto, and a lug on one of said scraping blades adapted to engage a diagonally positioned slot in the other of said scraping blades whereby a movement of one of said blades upon its pivot serves to cause a movement of the other blade upon its pivot.

7. In a scraper for green corn cutting machines, the combination of a pivotally mounted scraping blade, a second scraping blade pivotally mounted relative to said first-mentioned scraping blade at an angle thereto, a lug on one of said scraping blades adapted to engage a diagonally positioned slot in the other of said scraping blades whereby a movement of one of said scraping blades upon its pivot serves to cause a movement of the other scraping blade upon its pivot, and yielding means tending to hold said lug in normal position in said slot.

8. In a scraper for green corn cutting machines, the combination of a scraping blade, means for detachably supporting said scraping blade, a second scraping blade pivotally mounted on said first-mentioned scraping blade in alinement therewith, a pair of scraping blades pivotally mounted on said first-mentioned scraping blade alongside thereof, and yielding means tending to hold said scraping blades in normal position with a restricted opening between them for the passage of the cob to be scraped.

9. In a scraper for green corn cutting machines, the combination of a scraping blade, means for detachably supporting said scraping blade, a second scraping blade pivotally mounted on said first-mentioned scraping blade in alinement therewith, a pair of scraping blades pivotally mounted on said first-mentioned scraping blade alongside thereof, connections between said last-named scraping blades and said second scraping blade whereby when said last-named scraping blades are forced apart said second scraping blade is at the same time forced away from said first-mentioned scraping blade, and yielding means tending to hold said scraping blades in normal position with a restricted opening between them for the passage of the cob to be scraped, with the free ends of the first-named and second scraping blades in contact with a positioning rib.

10. In a scraper for green corn cutting machines, the combination of a scraping blade, means for detachably supporting said scraping blade, a second scraping blade pivotally mounted on said first-mentioned scraping blade in alinement therewith, a pair of scraping blades pivotally mounted on said first-mentioned scraping blade alongside thereof, lugs on said second scraping blade adapted to engage diagonally positioned slots in said last-named scraping blades respectively whereby when said last-named scraping blades are forced apart said second scraping blade is at the same time forced away from said first-named scraping blade, and springs connecting said last-named scraping blades to said second scraping blade tending to hold said scraping blades in normal position with a restricted opening between them for the passage of the cob to be scraped.

JOHN M. C. JONES.

Witnesses:
E. D. DURHAM,
C. L. KRAUSE.